May 20, 1924.
C. SCHENCK ET AL
METAL WHEEL
Original Filed June 17, 1920
1,494,812
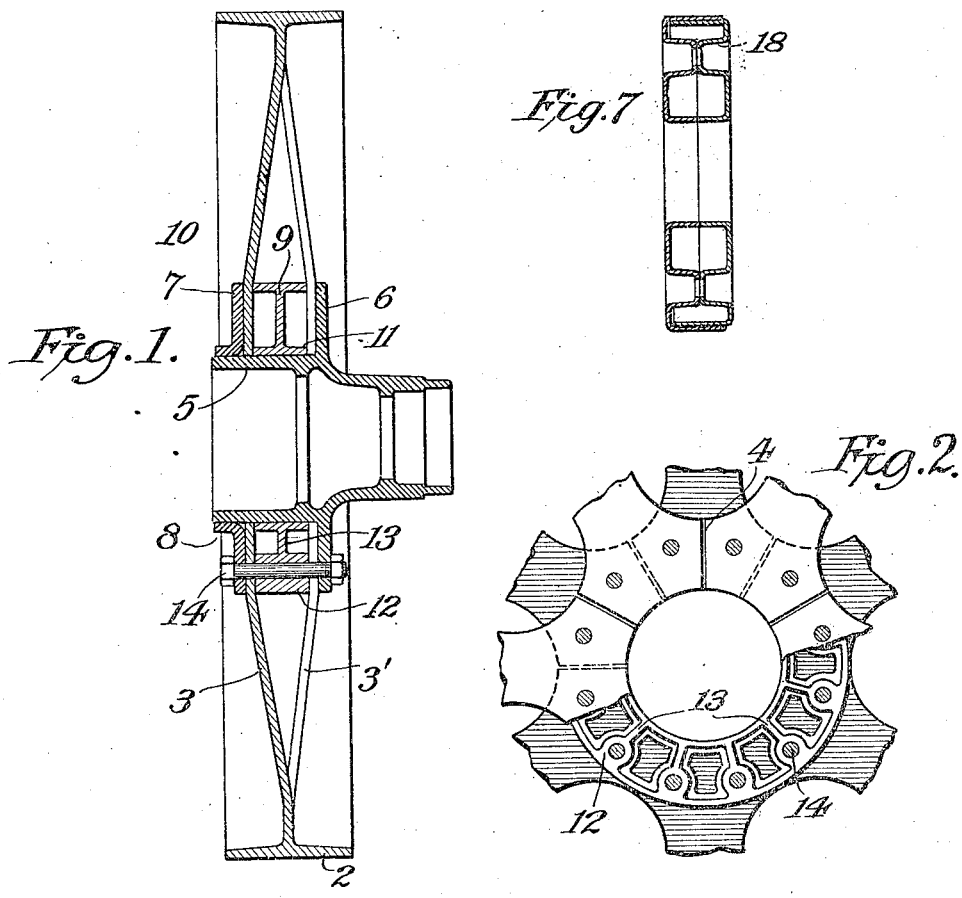
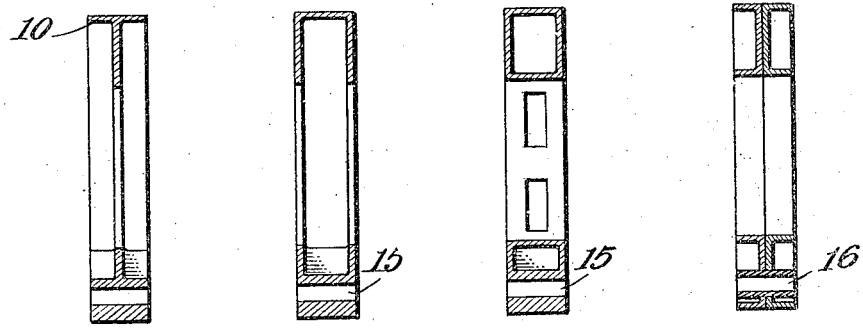
INVENTOR
Charles Schenck
and
BY Cyrus W. Bassett
Clarence Kerr
ATTORNEY Patented May 20, 1924.

1,494,812

UNITED STATES PATENT OFFICE.

CHARLES SCHENCK AND CYRUS W. BASSETT, OF BETHLEHEM, PENNSYLVANIA, ASSIGNORS TO BETHLEHEM STEEL COMPANY, OF BETHLEHEM, PENNSYLVANIA, A CORPORATION OF PENNSYLVANIA.

METAL WHEEL.

Application filed June 17, 1920, Serial No. 389,756. Renewed October 22, 1923.

*To all whom it may concern:*

Be it known that we, CHARLES SCHENCK and CYRUS W. BASSETT, citizens of the United States, residing at Bethlehem, Northampton County, Pennsylvania, have jointly invented new and useful Improvements in Metal Wheels, of which the following is a specification, reference being had to the accompanying drawings, in which—

Fig. 1 is a section of a metal wheel embodying our invention; Fig. 2 is a partial elevation thereof; and Figs. 3, 4, 5, 6 and 7 are sections of modified forms of spacers.

Our invention relates to hubs for metal wheels, in which the spokes are preferably formed from a continuous web of metal, as, for instance, the web of a bar beam or sheet, and are bent alternately to form two sets of spokes, and comprises means for attaching the hubs and spokes together. In hubs made in accordance with our invention, the thrust of the hub is transmitted directly to the spoke ends which are held in spaced relation by a separator and against the separator by the hub plates, and the spokes are interlocked together in such manner that the stresses imposed on one spoke are transmitted to adjacent spokes and the strain is thereby distributed. Our invention also consists in the arrangement and construction of parts which we shall hereinafter describe and claim.

Referring to the drawings, we have shown a wheel preferably made from a metal beam or bar, in which the rim 2 and spokes 3 3' are formed, respectively, from the flanges and web of a beam or bar and with the web portions bent alternately to form two sets of staggered spokes, and so arranged that the web or spoke portions are preferably in side contact on their edges 4 in the area of the hub, and comprise two sets of spokes 3 and 3'.

The hub comprises the main or interior hub member 5, which has an exterior annular flange 6 and a supplementary or exterior hub member 7 in parallel spaced relation to the flange 6, and which has an annular projection 8 engaging the periphery of the interior hub member 7. One set 3' of spokes bears against the inner face of the flange 6 and the other set 3 against the inner face of the exterior hub member 8. Between the sets of spokes is placed a separator or spacer 9 preferably in the form of a flat annulus, which has T-shaped external and internal flanges 10 and 11, and on each side raised bosses 12, each of which is connected to the flanges 10 and 11 by radial reinforcing ribs 13, the flanges 10 and 11 and bosses 12 being of the same width and affording bearings for the inner faces of the sets 3 3' of spokes.

The hub members 5 and 7 are secured to the spokes by the bolts 14, and each spoke is also secured to two spokes in the opposite set by the bolts 14, which in each instance preferably pass through the body of the spoke and through an aligned boss 12 on the spacer 9.

In Fig. 3 we have shown a modified form of spoke spacer or separator, also in the form of a flat annulus but in which only one T-shaped annular flange 10 is employed, the internal flange 11 of Fig. 1 being omitted. In the modified form of Figs. 4 and 5 the spacers are of U- and box-sections, respectively, in which the spoke ends are intended to bear directly against the sides. In these forms the bolt sleeves 15 may be cast within the body of the spacer.

In Fig. 6 we have shown a further modification of the spacer, consisting of a double channel section with the webs arranged face to face and preferably spot welded together to form a composite web. Short lengths of pipe or tubing 16 extending through the composite web and outwardly for the width of the spacer may be employed as bolt sleeves and to act as additional reinforcements to the flanges. The various forms of spoke spacing members may be made either from pressed steel plates or shapes or may be cast.

In Fig. 7 we have shown a further modification of the spacer made from two identically shaped pressed metal pieces of inverted U-shape in cross-section in which the bolt sleeves 18 are made by inwardly punched parts and the ends of the pieces overlap to form the ends of the spacer. The pieces are united by welding together their meeting faces in the axial plane of the spacer and their overlapping ends.

It will be seen that the construction which we have described is of great advantage, since each spoke in the hub portion of the wheel is not only supported by the spokes in the same set on either side, but it is also bolted to two spokes of the opposite set, thereby causing an interlocking of spokes, and an automatic distribution of the strain imposed on any one spoke. This spoke interlock serves to prevent distortion of the wheel or hub from driving or braking strains.

The terms and expressions which we have employed are used as terms of description and not of limitation, and we have no intention, in the use of such terms and expressions, of excluding any mechanical equivalents of the features shown and described or portions thereof, but recognize that various structural modifications are possible within the scope of the invention claimed.

What we claim is:

1. In a metal wheel, a hub, spokes arranged alternately to form two sets in the area of the hub, a spoke spacing member bearing on the hub barrel between the sets of spokes and equipped with raised bosses to form bearing points for the spokes, said bosses being apertured for the reception of bolts for securing the hub, spokes and spacers together, the said bosses providing means between bolt ends for resisting compression.

2. In a metal wheel, a hub, spokes arranged alternately to form two sets in the area of the hub, a spoke spacing member bearing on the hub barrel between the sets of spokes and equipped with raised bosses to form bearing points for the spokes, connecting webs between said bosses to permit adjacent bosses to support each other, said bosses being apertured for the reception of bolts for securing the hub, spokes and spacer together.

3. In metal wheels having spokes arranged alternately to form two sets in the area of the hub, a spoke spacing member bearing on the hub barrel between the sets of spokes, the spacing member comprising a flat annulus having reinforcing bosses on either side to form sleeves for connecting bolts and bearings for the inner faces of the spokes.

4. In metal wheels having spokes arranged alternately to form two sets in the area of the hub, a spoke spacing member bearing on the hub barrel between the sets of spokes, the spacing member comprising a flat annulus having reinforcing bosses on either side to form sleeves for connecting bolts and bearings for the inner faces of the spokes, and having also a T-shaped peripheral flange of the same width as the bosses.

CHARLES SCHENCK.
CYRUS W. BASSETT.